(12) United States Patent
Dourlens et al.

(10) Patent No.: US 6,637,942 B2
(45) Date of Patent: Oct. 28, 2003

(54) BEARING ASSEMBLY AND METHOD

(75) Inventors: Herve H. Dourlens, Manne-villette (FR); Dale F. Marshall, Le Havre (FR); Philippe Auber, Le Havre (FR)

(73) Assignee: Dresser-Rand Company, Olean, NY (US)

( * ) Notice: Subject to any disclaimer, the term of this patent is extended or adjusted under 35 U.S.C. 154(b) by 69 days.

(21) Appl. No.: 09/970,319

(22) Filed: Oct. 3, 2001

(65) Prior Publication Data

US 2003/0063821 A1 Apr. 3, 2003

(51) Int. Cl.$^7$ ................................................ F16C 17/03
(52) U.S. Cl. ............................................ 384/99; 384/117
(58) Field of Search ........................... 384/99, 117, 119, 384/130, 131

(56) References Cited

U.S. PATENT DOCUMENTS

| | | |
|---|---|---|
| 4,088,211 A | 5/1978 | Doller et al. |
| RE30,210 E | 2/1980 | Buono et al. |
| 4,276,974 A | 7/1981 | Ladin |
| 4,337,982 A | 7/1982 | Moringiello et al. |
| 4,457,667 A | 7/1984 | Seibert et al. |
| 4,517,505 A | 5/1985 | Cunningham |
| 4,783,179 A * | 11/1988 | Katayama et al. .......... 384/130 |
| 4,786,536 A | 11/1988 | Kaempen |
| 4,814,603 A | 3/1989 | Philips |
| 5,080,555 A | 1/1992 | Kempinger |
| 5,127,478 A | 7/1992 | Miller |
| 5,201,587 A | 4/1993 | Springer |
| 5,215,384 A * | 6/1993 | Maier .......................... 384/99 |
| 5,421,655 A | 6/1995 | Ide et al. |
| 5,427,455 A | 6/1995 | Bosley |
| 5,494,448 A | 2/1996 | Johnson et al. |
| 5,651,616 A * | 7/1997 | Hustak et al. ................ 384/99 |

* cited by examiner

Primary Examiner—Christopher P. Schwartz
(74) Attorney, Agent, or Firm—Haynes and Boone, LLP.

(57) ABSTRACT

A bearing assembly and method in which a bearing cage is disposed around a rotating member and a housing is disposed around the cage. A first portion of the radial outer surface of the cage extends in a slightly spaced relation to the corresponding portion of the inner surface of the housing, and a second portion of the radial outer surface of the cage projects from the first portion in a radial direction and engages the corresponding portion of the inner surface of the housing.

20 Claims, 1 Drawing Sheet

BEARING ASSEMBLY AND METHOD

BACKGROUND

This invention relates to a bearing assembly and method for a rotating member, and, more particularly, to a bearing assembly and method involving a bearing cage that extends between the rotating member and a bearing housing.

In many bearing designs of the above type, it is necessary to have a fairly precise engagement between the bearing cage and the bearing housing that will be sufficient through the range of manufacturing clearances of the bearing housing and bearing cage, yet will not generate a too high clamping force to deform the housing and cage, thereby maintaining a positive seal at the joint between the housing and cage, and improving control of the bearing geometry.

SUMMARY

According to an embodiment of this invention, a bearing cage extends between a rotating member and a bearing housing and engages the housing in a manner to insure that the engagement is sufficient through a range of manufacturing clearances of each component, yet does not generate too high a clamping force to deform the housing and cage, thereby maintaining a positive seal at the joint between the housing and cage, and improving control of the bearing geometry.

DETAILED DESCRIPTION

Figure 1:
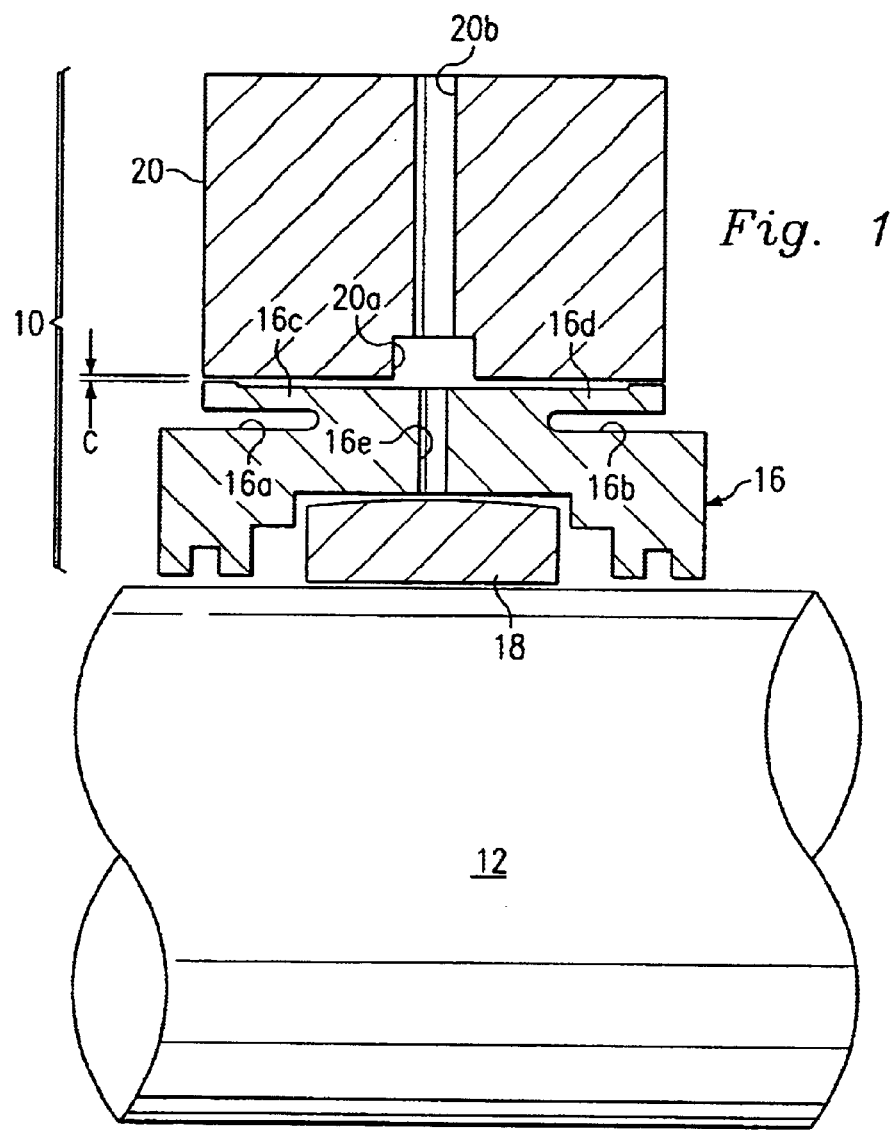
FIG. 1 is a cross-sectional view of the bearing assembly according to an embodiment of the present invention, shown in operative engagement with a rotor, which is shown in elevation.

Referring to FIG. 1 of the drawings, the reference numeral 10 refers in general to the bearing assembly according to an embodiment of the invention which surrounds a rotor 12. It is understood that the rotor 12 is rotated about its axis and forms part of an assembly that includes a driving system for imparting torque to the rotor, in a conventional manner.

An annular bearing cage 16 extends around the rotor 12 and has a internal recess formed therein for receiving a series of tilt pads 18, one of which is shown, which form the bearing members. Since the tilt pads 18 are conventional they will not be described in detail. It is also understood that one or more of the cage 16, and the housing 20 can be formed by two split arcuate sections that are attached at their respective ends, in a conventional manner.

A plurality of angularly-spaced, axially-extending, grooves, two of which are referred to by the reference numerals 16a and 16b, are formed in the outer periphery of the cage 16. The grooves 16a and 16b are spaced radially inwardly from the outer radial surface of the cage 16 a predetermined amount to form cantilevered portions 16c and 16d that extend radially outwardly from the respective grooves. The thickness of each cantilevered portion 16c and 16d is such that it functions as a mechanical spring in a manner to be described.

A radially-extending passage 16e is formed through the cage 16 for supplying lubricating oil to the tilt pad 18, in a manner to be explained.

An annular housing 20 surrounds the cage 16 and has an internal annular recess 20a which communicates with a radially-extending through passage 20b. Oil can thus be introduced to the passage 20b and passes through the latter passage, the recess 20a and the passage 16e of the cage 16 for supplying oil to the tilt pads 18.

A majority of the radial inner surface of the housing 20 is slightly spaced from the radial outer surface of the cage 16, including the cantilevered portions 16c and 16d, to form an annular clearance C which communicates with the recess 20a of the housing 20 and thus receives some of the above-mentioned oil.

Figure 2:
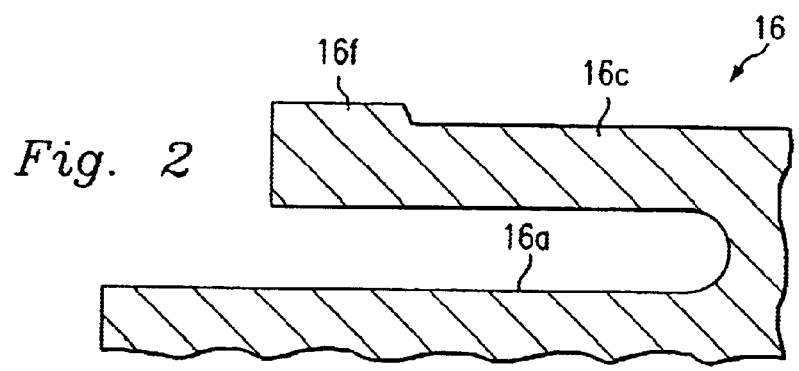
FIG. 2 is an enlarged cross-sectional view of a portion of the bearing assembly of FIG. 1.

The respective axial end portions of the radial outer surface of the cantilevered portions 16c and 16d are enlarged so as to project radially outwardly from the plane of the latter portions and engage the corresponding inner surfaces of the housing 20 in an interference fit. The enlarged portion associated with the cage portion 16c is shown by the reference 16f in FIG. 2. These enlarged portions, including the portion 16f, prevent the leakage of oil from the clearance C; and the axial lengths of the raised portions, including the portion 16f, are designed to minimize contact stresses between the cage 16 and the housing 20.

The thickness of each cage portion 16c and 16d is such that the stiffness of the mechanical springs formed by each portion can be adjusted relative to the bearing stiffness of the tilt pads 18.

The system 10 of the above embodiment thus has the following advantages:

1. A relatively low clamping force acts on the bearing housing 20 to eliminate the risk of deformation and leakage.
2. No deformation of the inside of the cage 16 occurs where the tilt pads 18 contacts the cage, allowing a much better control of the tilt pad bearing geometry.
3. There is less sensitivity to temperature effects on the housing 20 resulting in minimum deleterious effects on the interference fit between the enlarged portions, including portion 16f, of the cantilevered portions 16c and 16d and the corresponding surfaces of the housing 20.
4. The presence of the oil in the clearance C provides additional damping of the bearing assembly 10 in general, thus significantly increasing the damping provided to the rotor 12.

It is understood that variations may be made in the foregoing without departing from the scope of the invention. For example, the number of angularly-spaced grooves formed in the cage 16 can vary and, in fact there can be only one groove that is continuous in an angular direction. Also, the radial and axial lengths of the cage portions 16c and 16d, including the enlarged portion 16f, can vary from those shown in the drawings. Also the sealing between the bearing housing and cage can be done by other means than metal to metal contact as shown on the drawings.

Since other modifications, changes, and substitutions are intended in the foregoing disclosure, it is appropriate that the appended claims be construed broadly and in a manner consistent with the scope of the invention.

What is claimed is:

1. A bearing assembly for a rotor, the assembly comprising a cage surrounding the rotor, and a housing surrounding the cage, a first portion of the radial outer surface of the cage extending in a slightly spaced relation to the corresponding portion of the inner surface of the housing, a second portion of the radial outer surface of the cage projecting from the first portion in a radial direction and engaging the corresponding portion of the inner surface of the housing, and at least one axially-extending groove formed in the cage to form a cantilevered portion extending between the groove and the corresponding outer radial surface of the cage.

2. The assembly of claim 1 wherein a clearance is formed between the first portion of the radial outer surface of the cage and the corresponding portion of the inner surface of the housing, and further comprising a passage formed in the housing for introducing oil to the clearance.

3. The assembly of claim 2 further comprising a recess formed in the cage and a passage extending through the cage and to the recess, the latter passage receiving the oil from the clearance and passing it to the recess, and further comprising tilt pads disposed in the recess.

4. The assembly of claim 2 wherein the second portion of the radial outer surface of the cage is disposed at the respective axial end portions of the cage to prevent the leakage of oil from the clearance.

5. The assembly of claim 1 wherein a plurality of grooves are formed in the cage and extend in an angularly-spaced relationship to form a plurality of cantilevered portions, respectively.

6. The assembly of claim 5 wherein each of the cantilevered portions forms a mechanical spring.

7. The assembly of claim 1 wherein there is one continuous annular groove.

8. The assembly of claim 1 wherein the cage and the housing are annular.

9. The assembly of claim 1 wherein the cantilevered portion forms a mechanical spring.

10. The assembly of claim 1 wherein the second portion of the radial outer surface of the cage is disposed at the respective axial end portions of the cage.

11. A method of positioning a bearing cage and a bearing housing around a rotating member, the method comprising disposing the cage around the rotor, and disposing the housing around the cage with a first portion of the radial outer surface of the cage extending in a slightly spaced relation to the corresponding portion of the inner surface of the housing, and with a second portion of the radial outer surface of the cage projecting from the first portion in a radial direction and engaging the corresponding portion of the inner surface of the housing; and forming at least one axially-extending groove in the cage to form a cantilevered portion extending between the groove and the corresponding outer radial surface of the cage.

12. The method of claim 11 wherein a clearance is formed between the first portion of the radial outer surface of the cage and the corresponding portion of the inner surface of the housing, and further comprising a passage formed in the housing for introducing oil to the clearance.

13. The method of claim 12 further comprising forming a recess formed in the cage and forming a passage extending through the cage and to the recess, the latter passage receiving the oil from the clearance and passing it to the recess, and further comprising providing a tilt pad in the recess.

14. The method of claim 12 wherein the second portion of the radial outer surface of the cage is disposed at the respective axial end portions of the cage to prevent the leakage of oil from the clearance.

15. The method of claim 11 wherein a plurality of grooves are formed in the cage and extend in an angularly-spaced relationship to form a plurality of cantilevered portions, respectively.

16. The method of claim 15 wherein each of the cantilevered portions forms a mechanical spring.

17. The method of claim 11 wherein the cage and the housing are annular.

18. The method of claim 11 wherein there is one continuous annular groove.

19. The method of claim 11 wherein the cantilevered portion forms a mechanical spring.

20. The method of claim 11 wherein the second portion of the radial outer surface of the cage is disposed at the respective axial end portions of the cage.

* * * * *